(12) United States Patent
Vallee et al.

(10) Patent No.: US 10,599,969 B2
(45) Date of Patent: Mar. 24, 2020

(54) FASTENER INSERTION SYSTEM FOR FASTENERS WITH ANTENNAS

(71) Applicant: Utility Composites, Inc., Round Rock, TX (US)

(72) Inventors: Glenn E. Vallee, Westbrook, CT (US); Rajkiran R. Tiwari, Austin, TX (US); Pamela S. Tucker, Round Rock, TX (US)

(73) Assignee: Utility Composites, Inc., Hutto, TX (US)

(*) Notice: Subject to any disclaimer, the term of this patent is extended or adjusted under 35 U.S.C. 154(b) by 528 days.

(21) Appl. No.: 15/360,464

(22) Filed: Nov. 23, 2016

(65) Prior Publication Data

US 2018/0144230 A1    May 24, 2018

(51) Int. Cl.
*G06K 19/077* (2006.01)
*B25C 5/11* (2006.01)
*G06K 19/04* (2006.01)

(52) U.S. Cl.
CPC .......... *G06K 19/07758* (2013.01); *B25C 5/11* (2013.01); *G06K 19/04* (2013.01)

(58) Field of Classification Search
CPC ........... G06K 19/07758; F16B 15/0015; F16B 1/0071; B25C 5/11
See application file for complete search history.

(56) References Cited

U.S. PATENT DOCUMENTS

| | | | |
|---|---|---|---|
| 5,195,672 A | 3/1993 | Souverain | |
| 5,520,700 A | 5/1996 | Beyar et al. | |
| 5,873,891 A | 2/1999 | Sohn | |
| 5,884,829 A * | 3/1999 | Wingert | B25C 1/008 227/109 |
| 6,172,608 B1 | 1/2001 | Cole | |
| 7,280,044 B2 | 10/2007 | Kubby | |
| 7,975,892 B2 | 7/2011 | Yeh | |
| 8,146,789 B2 | 4/2012 | Hu et al. | |
| 8,622,298 B2 | 1/2014 | Huber | |
| 9,422,962 B1 * | 8/2016 | Stratton | F16B 15/0015 |

(Continued)

OTHER PUBLICATIONS

Co-Pending U.S. Appl. No. 15/067,290 entitled, "RFID Tracking Fastener" to Tucker et al. filed Mar. 11, 2016.

*Primary Examiner* — Christopher M Koehler
*Assistant Examiner* — Kyle A Cook
(74) *Attorney, Agent, or Firm* — Kowert, Hood, Munyon, Rankin & Goetzel, P.C.

(57) ABSTRACT

In some embodiments, a system and/or method for installing a tracking fastener using a fastener insertion device. The fastener insertion device may include a handle and a fastener receiver. The handle may form a receiving chamber therein. The receiving chamber may receive, during use, tracking fasteners within. The tracking fasteners may include an antenna at least partially positioned in a proximal end of the plastic tracking fastener including a first end or a first and a second end extending out of the proximal end of the tracking fastener. The fastener receiver may include a striker, a diverter, a router, and a tapered reverse angle guide. The diverter, guide (e.g., router, tapered reverse angle guide), and a designed striker may position, during use, the antenna around the driver mechanism and away from the striker tip. The striker inserts the fastener into a substrate without damage to the antenna.

21 Claims, 9 Drawing Sheets

(56) References Cited

U.S. PATENT DOCUMENTS

2006/0260546 A1\* 11/2006 Usami .............. G06K 19/07749
  118/722
2008/0142563 A1  6/2008 McBroom et al.
2011/0248066 A1\* 10/2011 Hu ............................ B25C 5/16
  227/127

\* cited by examiner

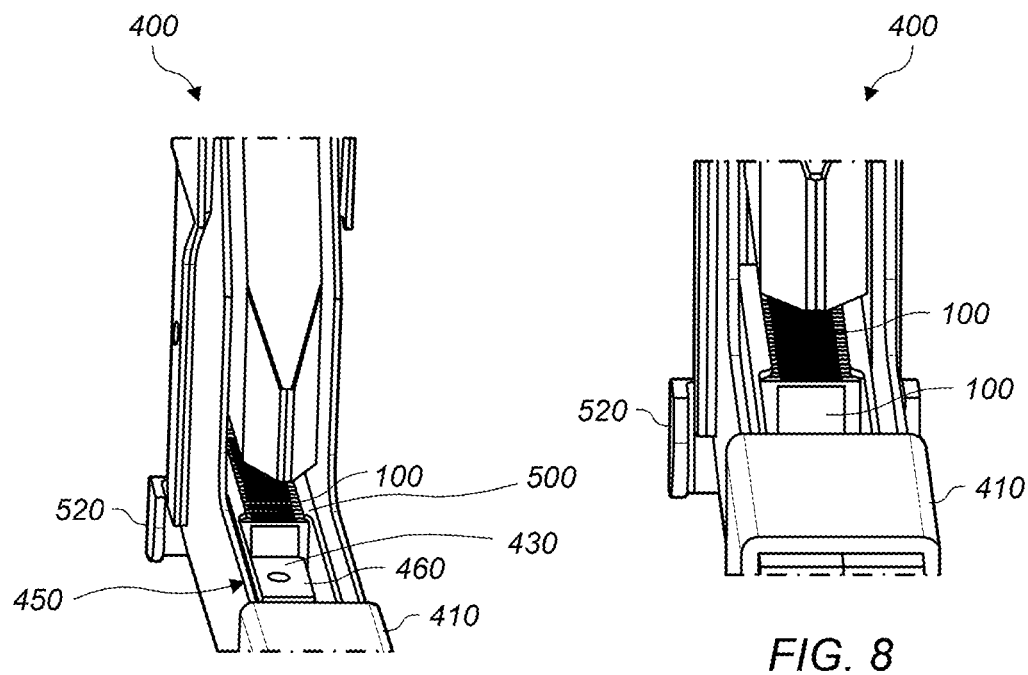
FIG. 7
FIG. 8
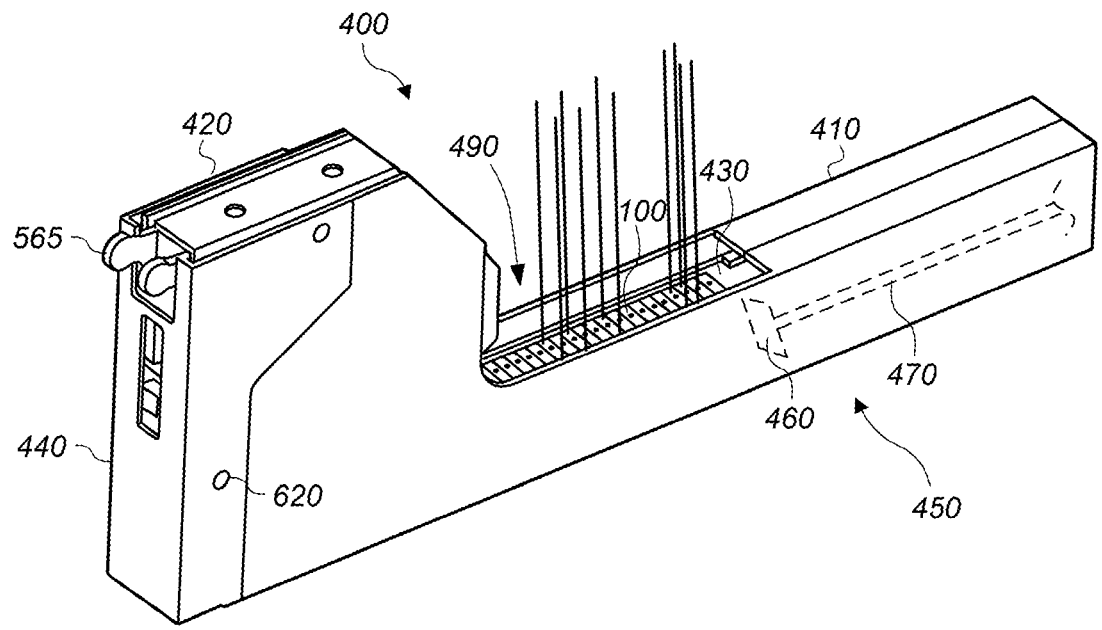
FIG. 9

FASTENER INSERTION SYSTEM FOR FASTENERS WITH ANTENNAS

BACKGROUND OF THE INVENTION

1. Field of the Invention

The present disclosure generally relates to tracking fasteners. More particularly, the disclosure generally relates to systems and methods which, facilitate the rapid insertion of tracking fasteners containing ultra-high frequency (UHF) radio-frequency identification devices (RFID) using a fastener insertion device which accommodates fasteners (e.g., staples) with antennas.

2. Description of the Relevant Art

Shipping of freight across distances is carried out daily throughout the world. One of the greatest challenges associated with shipping freight, no matter the distance, is tracking the freight during shipping. Goods shipped by freight in high numbers are increasingly transported in containers, on pallets or ULDs (unit load devices) in transport vehicles. Methods of tracking freight include tagging the freight directly or tagging the pallet or crate, which carries the freight. Freight must be tracked to ensure that goods are not misplaced during shipping and reach their predetermined destination.

One example of freight which requires tracking includes cut trees in the logging industry. In the logging industry cut trees may need to be tracked during transport and/or tracked as regards inventory purposes. Most applications that need RFID typically use an adhesive tag or a tag that can be attached on a card, for example, to clothing. However, there are instances where a card tag or adhesive tag cannot be easily attached to the substrate using conventional methods. For example, common RFID tags will not stick onto rough lumber. Many RFID tags use low frequency (LF) and the antenna is very tiny so the read range is maybe an inch or two. RFID tags that use high frequency (HF) have read ranges from ½" to about 36". UHF may be employed in RFID tracking which allows for a longer read range (5 feet to 40 feet).

An RFID system and/or method capable of long read range, for tracking of goods during transport and/or for inventory control, and which may more easily couple to rough surfaces (e.g., wood), would be highly desirable.

Therefore, a system and/or method which facilitate rapid insertion of UHF RFID fasteners using a fastener insertion device which accommodates fasteners with antennas and have unique striker and feeding mechanism to drive fasteners without any damage to the antenna wires would be highly desirable.

SUMMARY

In some embodiments, a system and/or method may include installing a tracking fastener using a fastener insertion device. The fastener insertion device may include a handle and a fastener receiver. The handle may form a receiving chamber therein. The receiving chamber may receive, during use, tracking fasteners within. The tracking fasteners may include a proximal end and at least one elongated member including at least one distal end which penetrates a surface of an object during insertion. The tracking fasteners may include an antenna at least partially positioned in the proximal end of the plastic tracking fastener. The tracking fastener may include a secondary antenna that is electromagnetically coupled to the primary antenna. The secondary antenna may include a first end or a first and second end extending out of the proximal end of the tracking fastener. The fastener receiver may be coupled to a second end of the handle such that the fastener receiver is in communication with the receiving chamber.

In some embodiments, a fastener insertion device may be powered by various means including, but limited to, manually, electric, pneumatic, gas, combustion, etc.

In some embodiments, the fastener receiver may include a striker, an actuator, an engagement mechanism, and a diverter. The striker may, when activated, strike, during use, a head of the fastener such that distal end(s) of elongated member(s) coupled to the head of the fastener penetrate, during use, a surface of an object.

In some embodiments, the striker has an upside down U-shaped slot at the head, which allows it to strike the head of the fastener without damaging antenna/wire(s) emanating out of the proximal end of the fastener.

In some embodiments, the actuator may be coupled to the fastener receiver. The engagement mechanism may couple the striker to the actuator. The engagement mechanism may transmit, during use, a first force applied in a first direction from the actuator to the striker as a second force in a second direction.

In some embodiments, the diverter may position, during use, the first end of the secondary antenna in a first channel along a first side of the fastener receiver and the second end of the secondary antenna, if present, in a second channel along a second side of the fastener receiver. The second side of the fastener receiver may be positioned opposite the first side of the fastener receiver.

In some embodiments, the actuator is linearly-slidably disposed on the fastener receiver.

In some embodiments, the striker is linearly-slidably disposed on the fastener receiver.

In some embodiments, the first direction is substantially opposite to the second direction.

In some embodiments, the engagement mechanism may include a first connector and a second connector. The first connector may couple the striker to the second connector and the second connector may couple the first connector to the actuator. The first and second connectors may function such that a force applied to the actuator is transmitted during use to a proximal end or head of a tracking fastener via the striker.

In some embodiments, the fastener receiver may include a resilient member such that after use of the fastener insertion device the resilient member moves, during use, the striker and the actuator back to a starting position.

In some embodiments, the fastener receiver may include a router. The router functions to reposition the first and second ends of the antenna as the tracking fastener moves toward the striker such that the first end and second end, if present, are bent away from the striker and towards a proximal first end of the hammer tacker fastener insertion device.

In some embodiments, a tapered reverse angle guide is positioned on the magazine just behind the striker to guide the first end and second end, if present, of the antenna emanating out of the fastener away from the striker tip to avoid any damage to the wires from striker during insertion of fastener, into surface of an object.

In some embodiments, the receiving chamber comprises an opening through which the tracking fasteners are positionable.

In some embodiments, the receiving chamber may include an opening through which the tracking fasteners are positionable. Forward of the opening may include a lip which securely retains the tracking fasteners once positioned forward of the receiving chamber.

In some embodiments, the tracking fasteners are tracking staples.

In some embodiments, a method may include installing a tracking fastener using a fastener insertion device. The method may include positioning a tracking fastener in a receiving chamber in a handle of a fastener insertion device as described herein. The method may include conveying the tracking fastener through the receiving chamber to a fastener receiver of the fastener insertion device coupled to a second end of the handle. The method may include positioning the first end of the secondary antenna in a first channel along a first side of the fastener receiver and the second end of the secondary antenna, if present, in a second channel along a second side of the fastener receiver using a diverter. The method may include applying a first force in a first direction using a surface of an object to an actuator such that the actuator moves in the first direction relative to the fastener receiver to which the actuator is coupled. The method may include transmitting the first force applied in the first direction from the actuator to a striker as a second force in a second direction using an engagement mechanism. The method may include transmitting the second force from the striker to the tracking fastener such that the distal end of the at least one elongated member penetrates the surface of the object.

In some embodiments, a method may include conveying the tracking fasteners in the fastener insertion device in a manner that protects the antenna(s) from damage during indexing of the fasteners and driving the fasteners into the surface of an object.

In some embodiments, a method may include guiding the antenna away from moving parts of the fastener insertion device and particularly away from the striker using various components in the fastener insertion device, such as a striker design, diverter, a router and/or tapered reverse angle guide.

In some embodiments, a method may include striking the tracking fastener on the head without striking the portion of the fastener head that contains the antenna protrusion.

In some embodiments, a method may include penetrating the surface of the object with a tracking fastener without damage to the antenna of the tracking fastener.

BRIEF DESCRIPTION OF THE DRAWINGS

Advantages of the present invention may become apparent to those skilled in the art with the benefit of the following detailed description of the preferred embodiments and upon reference to the accompanying drawings.

FIG. 7 depicts a diagram of a rear perspective expanded view of an embodiment of a fastener receiving chamber of a fastener insertion device (antennas not depicted for clarity).

FIG. 8 depicts a diagram of a rear perspective expanded view of an embodiment of a fastener receiving chamber of a fastener insertion device (antennas not depicted for clarity).

FIG. 9 depicts a diagram of a perspective interior view of an embodiment of a fastener receiving chamber of a fastener insertion device (some antennas not depicted for clarity).

Figure 1A:
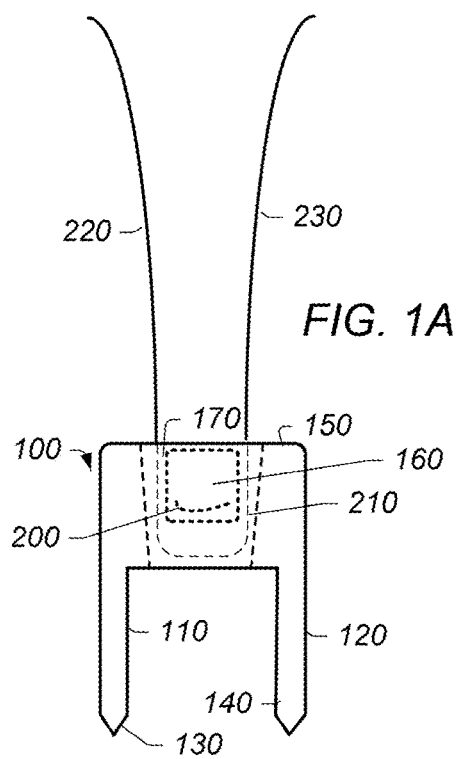
FIG. 1A depicts a diagram of a front view of an embodiment of a tracking staple including a dipole antenna.
Figure 1B:
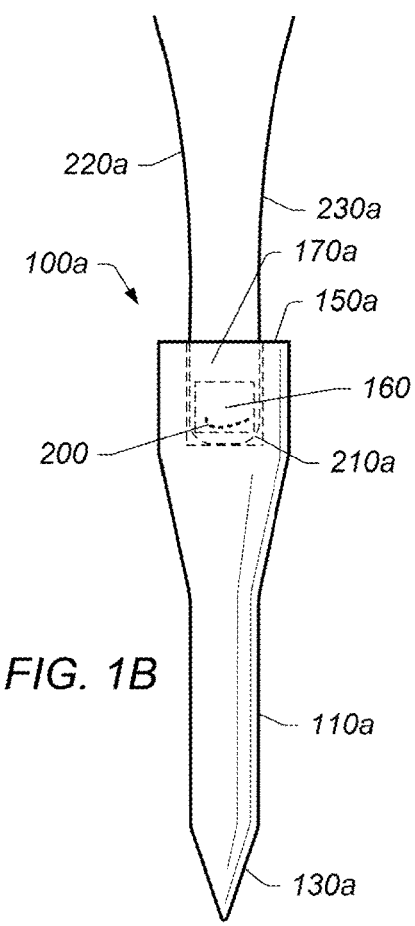
FIG. 1B depicts a diagram of a front view of an embodiment of a tracking nail including a dipole antenna.
Figure 1C:
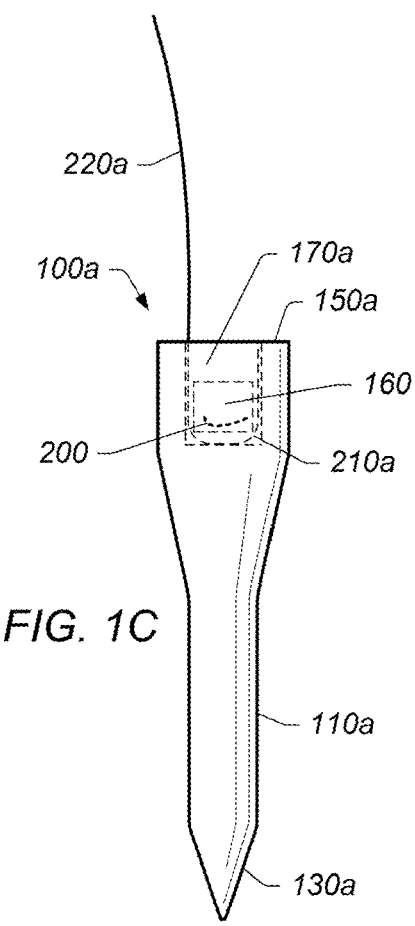
FIG. 1C depicts a diagram of a front view of an embodiment of a tracking nail including a monopole antenna.
Figure 1D:
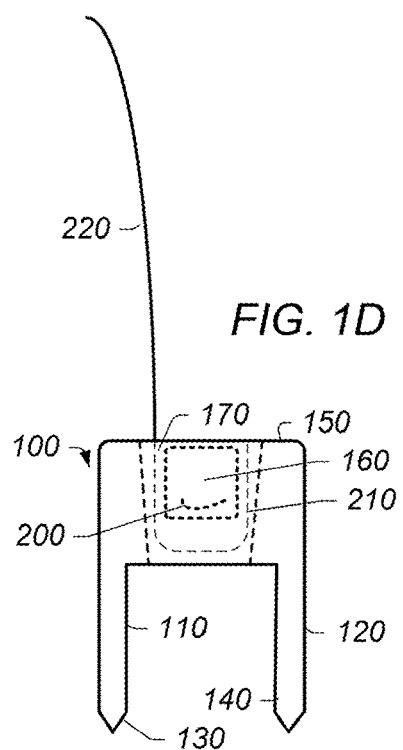
FIG. 1D depicts a diagram of a front view of an embodiment of a tracking staple including a monopole antenna.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process affects another process or structure without the involvement of an intermediate step or component.

The term "interrogator" (also known as "reader") as used herein generally refers to a radio transmitter and receiver that uses an interrogator antenna and may include a supplementary antenna for sending out a signal that triggers a transponder and for receiving and displaying the reply from the transponder. The interrogator sends data received from the transponder to a receiver (e.g., a server, a computer, etc. on which appropriate software may be run) for further processing.

The term "RFID" as used herein generally refers to radio-frequency identification and is the wireless use of electromagnetic fields to transfer data, for the purposes of automatically identifying and tracking tags attached to objects or items. The tags may contain electronically stored information such as, but not limited to, inventory details.

The term "tag" as used herein generally refers to a chip (e.g., a RFID chip) combined with an antenna and put together in some certain shape.

The term "UHF RFID" as used herein generally refers to ultra-high frequency radio-frequency identification and is generally the wireless use of electromagnetic fields to transfer data, for the purposes of automatically identifying and tracking tags attached to objects or items. The tags may contain electronically stored information relating to the objects or items.

The term "wireless identification device" as used herein generally refers to a chip itself (e.g., a RFID chip).

Embodiments

Tracking Fasteners

In some embodiments, a tracking fastener may include a tracking staple or tracking nail 100, 100a. FIGS. 1A-D depict diagrams of a front view of an embodiment of a tracking staple and tracking nail. The tracking staple may include a first elongated member 110 and a second elongated member 120. The tracking nail may include an elongated member 110a. The elongated members of the tracking staple may include distal ends 130, 140. The elongated member of the tracking nail may include a distal end 130a. The distal end(s) of the tracking fastener may include a penetrating end(s). The distal end(s) may include a sharpened or pointed end as depicted in FIGS. 1A-D.

The distal end in some embodiments may not include a sharpened or pointed end depending on the use, or the end diameter may be small enough that the distal end does not require an edge to penetrate a surface depending upon how much force is applied to the tracking fastener and the hardness of the surface to be penetrated. The distal end may penetrate, during insertion, a surface of an object. The distal end of tracking fastener may penetrate a surface of an object during insertion and be firmly held in place on the object to be tracked.

The elongated members 110, 110a and 120 may include a proximal end 150, 150a. The tracking fastener may include a wireless identification device 160. The wireless identification device may contain electronically stored information associated with an object to which the plastic tracking fastener is coupled. The plastic tracking fasteners may be coupled to the object by penetrating a surface of an object during insertion and firmly holding in place on the object to be tracked.

In some embodiments, the wireless identification device 160 may be at least partially positioned in the proximal end 150, 150a of the plastic tracking fastener 100, 100a. The wireless identification device 160, primary antenna 200, and secondary antenna 210, 210a may be at least partially positioned in an opening 170, 170a. The wireless identification device 160, primary antenna 200, and secondary antenna 210, 210a may be positioned in the opening 170, 170a such that the wireless identification device 160, primary antenna 200, and a portion of the secondary antenna 210, 210a is fully positioned in the opening.

In some embodiments, a composition (e.g., the polymer used to form the body of the tracking fastener) may be used to fill in the opening 170, 170a of the tracking fastener to inhibit components positioned in the opening from falling out. The composition may include a polymeric composition (e.g., an adhesive, an epoxy, etc.). In some embodiments, the wireless identification device, primary antenna, and secondary antenna may be directly positioned into a tracking fastener mold prior to forming the tracking fastener to reduce the number of manufacturing steps.

In some embodiments, the wireless identification device may include an RFID device. RFID may include the wireless use of electromagnetic fields to transfer data, for the purposes of automatically identifying and tracking tags attached to objects.

In some embodiments, the wireless identification device may include an UHF RFID device. UHF is the ITU designation for radio frequencies in the range between 300 MHz and 3 GHz, also known as the decimeter band as the wavelengths range from one meter to one decimeter.

In some embodiments, the tracking fastener may include a secondary antenna 210, 210a at least partially positioned in the proximal end 150, 150a of the plastic tracking fastener 100, 100a. The secondary antenna 210, 210a may not be directly connected to the wireless identification device, but may have some coupling (e.g., electromagnetic) thereto, as well as coupling to the interrogator antenna. Coupling between the interrogator antenna and the wireless identification device through the secondary antenna may, either as a result of the secondary antenna being physically large or a portion of it positioned close to the wireless identification device, easily exceed direct coupling between the interrogator and the wireless identification device through the primary antenna alone. The secondary antenna may collect more energy from the interrogation field. The secondary antenna may be shaped or oriented to be responsive to more field directions and provide higher read range than is practicable for the primary antenna itself. The secondary antenna may be made conformable to any number of shapes that optimize tracking response. The secondary antenna may provide enhanced coupling between an interrogator and a plurality of wireless identification devices which the interrogator interrogates either simultaneously or within a short space of time.

In some embodiments, at least a portion or all of the secondary antenna may be coated. The coating may include a thermoplastic covering over the antenna. The secondary antenna may need to be coated for insulation or for protection from the elements when used outdoors or in harsh environments. The coating may include a crosslinked polymer covering over the antenna. The coating may include a biodegradable polymer covering over the antenna. The crosslinked polymer or biodegradable polymer may be compatible with the pulping process. A more detailed discussion of tracking fasteners may be found in U.S. application Ser. No. 15/067,290 entitled "RFID TRACKING FASTENER" to Tucker et al. which is incorporated by reference herein in its entirety.

Most applications that need RFID can use an adhesive tag or a tag that can be attached on a card like to clothing, but there are applications where a card tag or adhesive tag cannot stick or cannot be easily attached to the substrate. For example, lumber (for inventory control) and pallets (for supply chain control) may be used with wireless identification tags, and there could be other applications where a tracking fastener can be inserted into the surface of an object and firmly held in place but a flat tag cannot stick or be otherwise attached. Common RFID tags will not stick onto rough lumber. Additionally, flat tags may not provide read range or read angles as long or wide as the tracking fastener described in application Ser. No. 15/067,290.

Figure 2A:
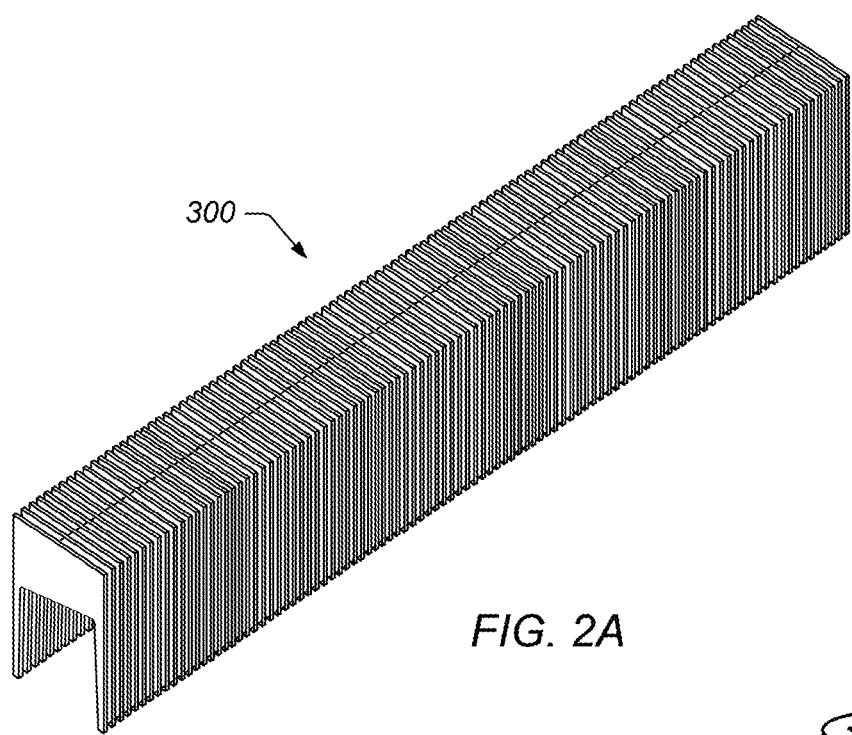
FIG. 2A depicts a diagram of a perspective view of an embodiment of a collated plurality of tracking staples to be inserted into a surface of an object using a staple insertion device (antennas not depicted for clarity).
Figure 2B:
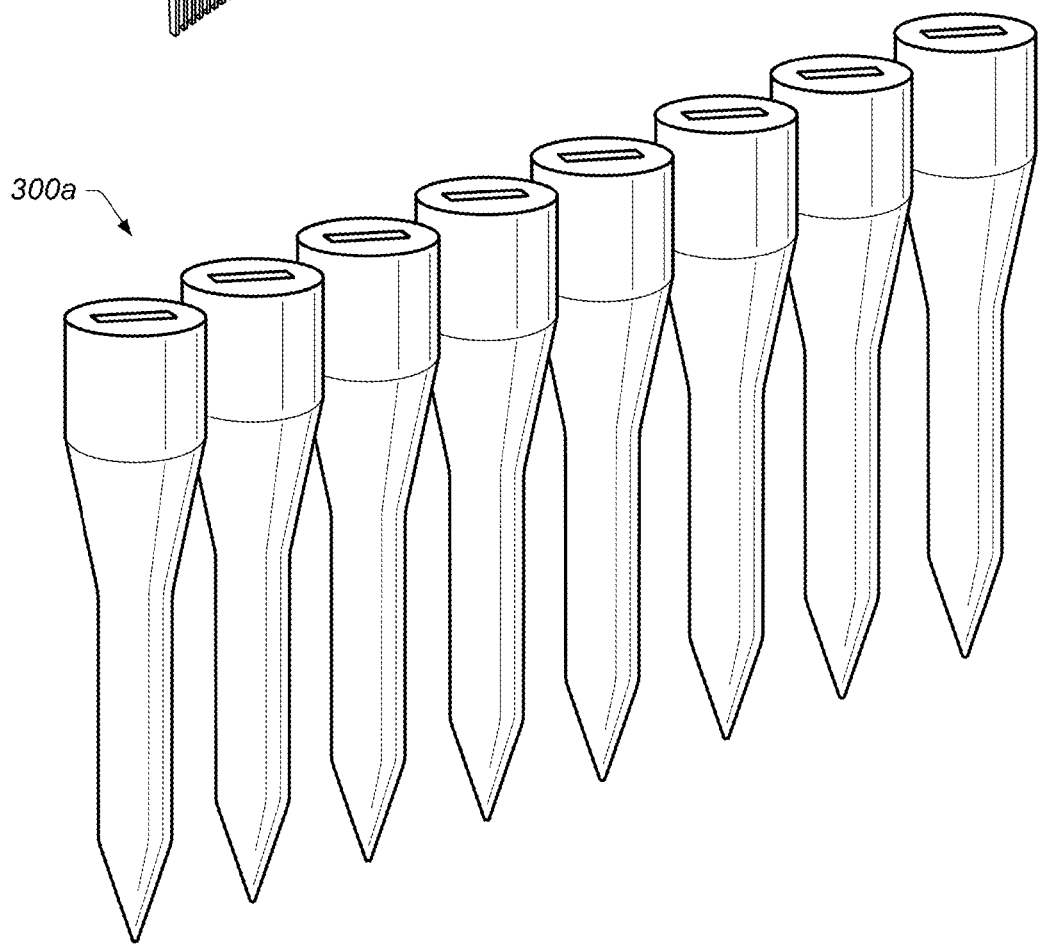
FIG. 2B depicts a diagram of a perspective view of an embodiment of a collated plurality of tracking nails to be inserted into a surface of an object using a nail insertion device (antennas not depicted for clarity).
Figure 3:
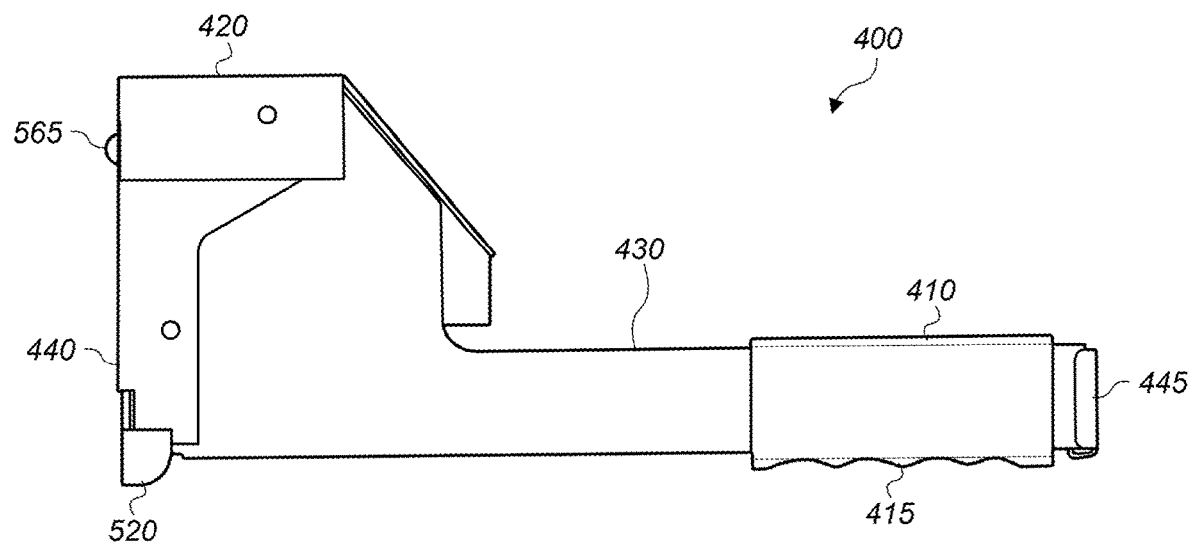
FIG. 3 depicts a diagram of a side exterior view of an embodiment of a fastener insertion device.
Figure 4:
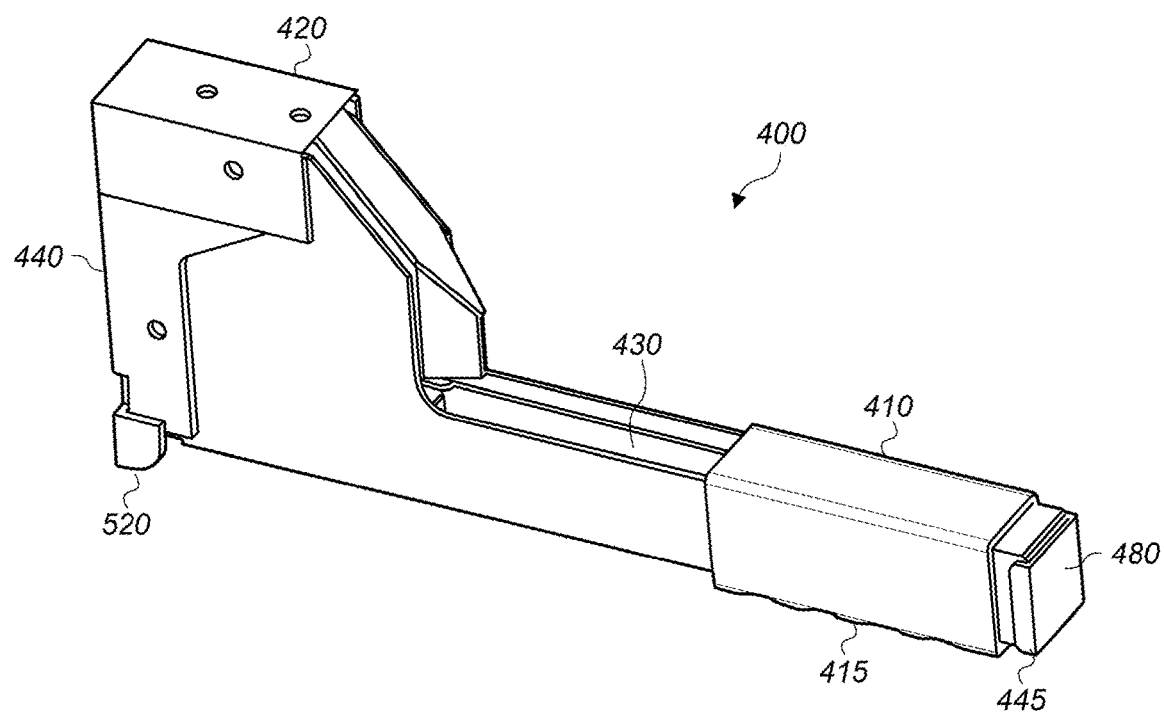
FIG. 4 depicts a diagram of a top perspective exterior view of an embodiment of a fastener insertion device.
Figure 5:
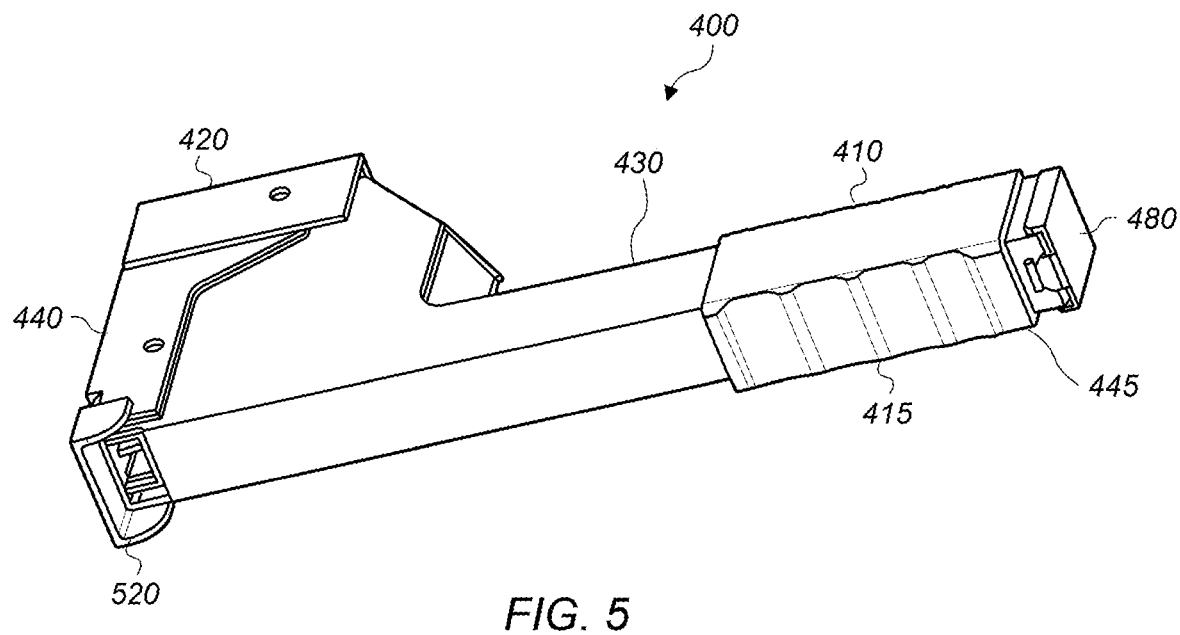
FIG. 5 depicts a diagram of a bottom perspective exterior view of an embodiment of a fastener insertion device.
Figure 6:
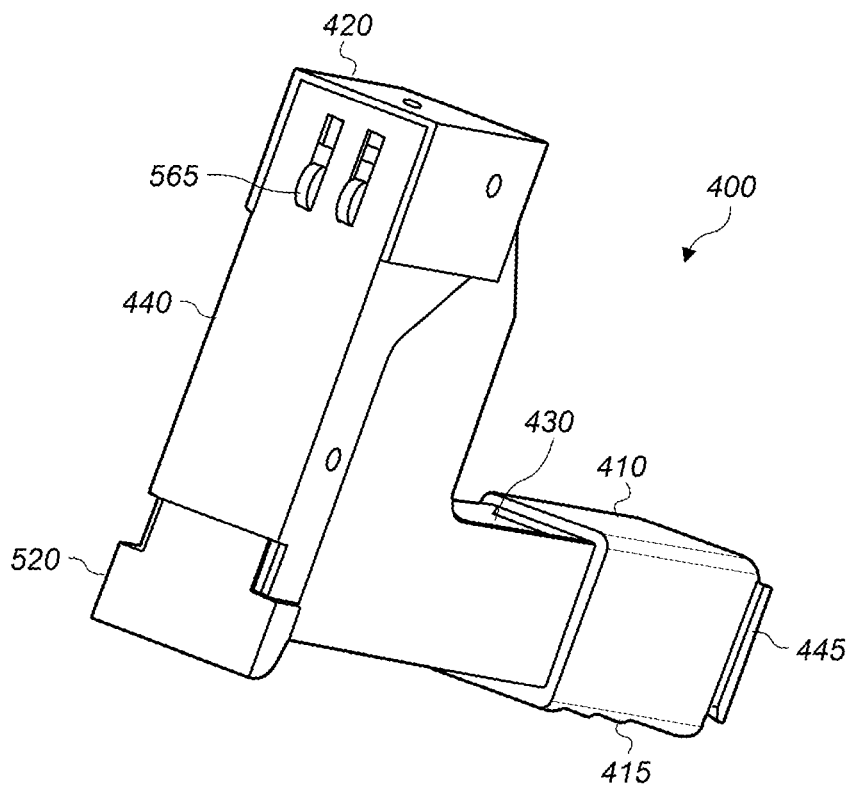
FIG. 6 depicts a diagram of a front perspective exterior view of an embodiment of a fastener insertion device.

In some embodiments, the tracking fastener may be configured for insertion using a fastener insertion device. In some embodiments, the tracking fastener may be inserted into the surface of an object singly, using a hammer or similar tool. In some embodiments, a tracking fastener is formed as part of plastic tracking fastener pack 300, 300a (e.g., as depicted in FIGS. 2A-B shown without secondary antenna for clarity) mountable in a fastener insertion device. The tracking fastener pack may include a plurality of tracking fasteners of the invention joined in a strip, belt, clip or the like for sequential entry into a fastener insertion device and subsequent penetration of materials such as wood, plasterboard, plastics and the like. It is especially contemplated that the tracking fastener packs of the invention will be arranged end-to-end and fed one-by-one into a fastener insertion device. The tracking fastener insertion device may include automatic and manual insertion devices for tracking fasteners, including nailers, and staplers activated automatically, such as those having pneumatic, electric, shell or cartridge-activated hammers, or with hammers activated manually, such as spring-activated or momentum activated hammers.

Tracking Fastener Insertion Device

The tracking fastener pack may require specially designed nailers or staplers that are similar in function to industry standard nailers and staplers for metal fasteners but with several unique features to accommodate the protruding antennas. In some embodiments, the tracking fasteners may be drivable at least in a surface of a commodity wood substantially without deformation or breakage by the fastener insertion device. The commodity wood may include but not limit to pine, chip board, oak, maple, cedar, redwood or cherry or other manufactured wood product, harvested wood, or kiln dried solid wood.

In some embodiments, a system and/or method for installing a tracking fastener using a specialized fastener insertion device accounting for the problems associated with installing a fastener with one or more antenna ends emanating from a head of the fastener. One of the foremost problems includes how to handle the antenna so that the antenna do not get entangled and/or interfere with the striking mechanism of the fastener insertion device during insertion. FIGS. 3-6 depict a diagram of a side exterior view, a top perspective exterior view, a bottom perspective exterior view, and a front perspective exterior view respectively of an embodiment of a fastener insertion device 400.

In some embodiments, the fastener insertion device 400 may include a handle 410 and a fastener receiver 420. The handle 410 may form a receiving chamber 430 therein. The fastener receiver 420 may be coupled to a second end 440 of the fastener insertion device 400 (as opposed to first end 445) such that the fastener receiver is in communication with the receiving chamber 430. The receiving chamber 430 may receive, during use, tracking fasteners 100, 100a within. As such, tracking fasteners positioned in the receiving chamber may be conveyed into the fastener receiver and through at least a portion of the fastener receiver towards a second end 440 of the fastener insertion device.

In some embodiments, the handle 410 may include a gripping device 415. A gripping device 415 may function to increase a coefficient of friction between a user and the handle 410. The gripping device may include surface deformations, which increase the coefficient of friction. The gripping device may be formed from a natural or synthetic rubber and/or a plastic, which increase the gripping coefficient of friction.

FIGS. 7-8 depict a diagram of a rear perspective expanded view of an embodiment of a receiving chamber 430 of a fastener insertion device 400. FIG. 9 depicts a diagram of a front perspective interior view of an embodiment of a fastener insertion device 400. In some embodiments, the fastener insertion device 400 may include an advancement mechanism 450. The advancement mechanism may function to convey the tracking fasteners 100, 100a, positioned in the receiving chamber 430, through the receiving chamber in the handle 410 towards into the fastener receiver 420 and through at least a portion of the fastener receiver towards a second end 440 of the fastener insertion device 400. As tracking fasteners are discharged from the fastener receiver during use the advancement mechanism 450 conveys any remaining fasteners into the fastener receiver such that a new fastener is positioned for discharge/installation to replace the recently driven/installed fastener. The advancement mechanism 450 may include a pusher 460 (e.g., as depicted in FIG. 7), a resilient portion 470 (e.g., as depicted in FIG. 9), and a locking mechanism 480 (e.g., depicted in FIG. 4-5).

The pusher 460 may abut against tracking fasteners 100, 100a in the receiving chamber 430 during use. A resilient portion 470 may be coupled to the pusher 460. The resilient portion may apply pressure to the pusher during use, functioning to convey the fasteners through the receiving chamber 430. A locking mechanism 480 may be coupled to an opposing end, relative to the pusher, of the resilient portion. The locking mechanism may be couplable to the first end 445 of the handle 410 of the fastener insertion device 400. The locking mechanism 480 may be couplable to a first end of the handle such that the resilient portion does not push the locking mechanism away from the second end of the handle 410 when fasteners are positioned in the fastener insertion device and the pusher is abutting the fasteners. When the locking mechanism is coupled to the first end of the fastener insertion device the resilient member is of an appropriate length and tension as to apply pressure to the pusher and adjacent fasteners such that the fasteners are conveyed through the receiving chamber.

The tracking fasteners may, as described herein and in Tucker et al., include a proximal end and at least one elongated member including at least one distal end that penetrates a surface of an object during insertion. The tracking fasteners may include an antenna at least partially positioned in the proximal end of the plastic tracking fastener. The antenna may include a first end or a first and second end extending out of the proximal end of the tracking fastener.

In some embodiments, the receiving chamber 430 may include an opening 490 (e.g., depicted in FIGS. 9 and 12) through which the tracking fasteners 100 are positionable. At least a portion forward of the opening may include a lip 500 (e.g., depicted in FIGS. 7 & 12) which securely retains or at least inhibits removal or at least accidental removal of the tracking fasteners 100, 100a once positioned forward of the receiving chamber 430.

Figure 10A:
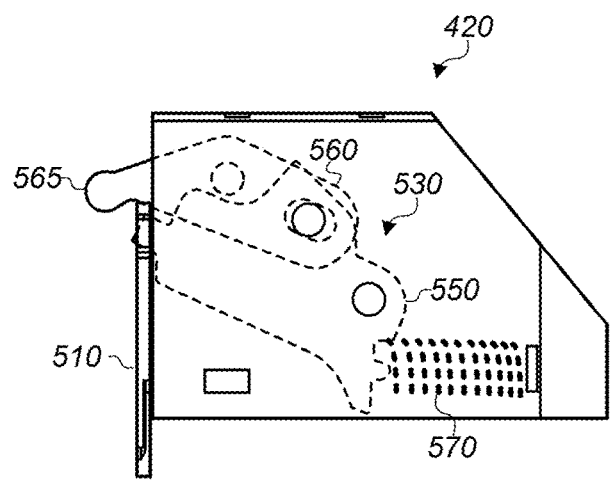
FIGS. 10A-B depict a diagram of a side interior view of an embodiment of a fastener receiver of a fastener insertion device in a starting position.
Figure 10B:
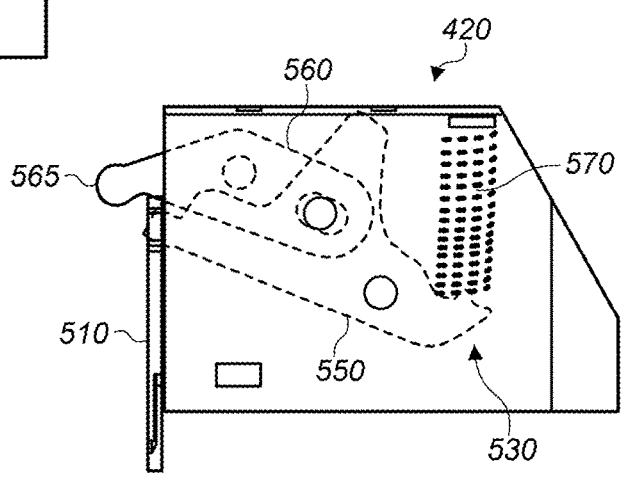
Figure 11A:
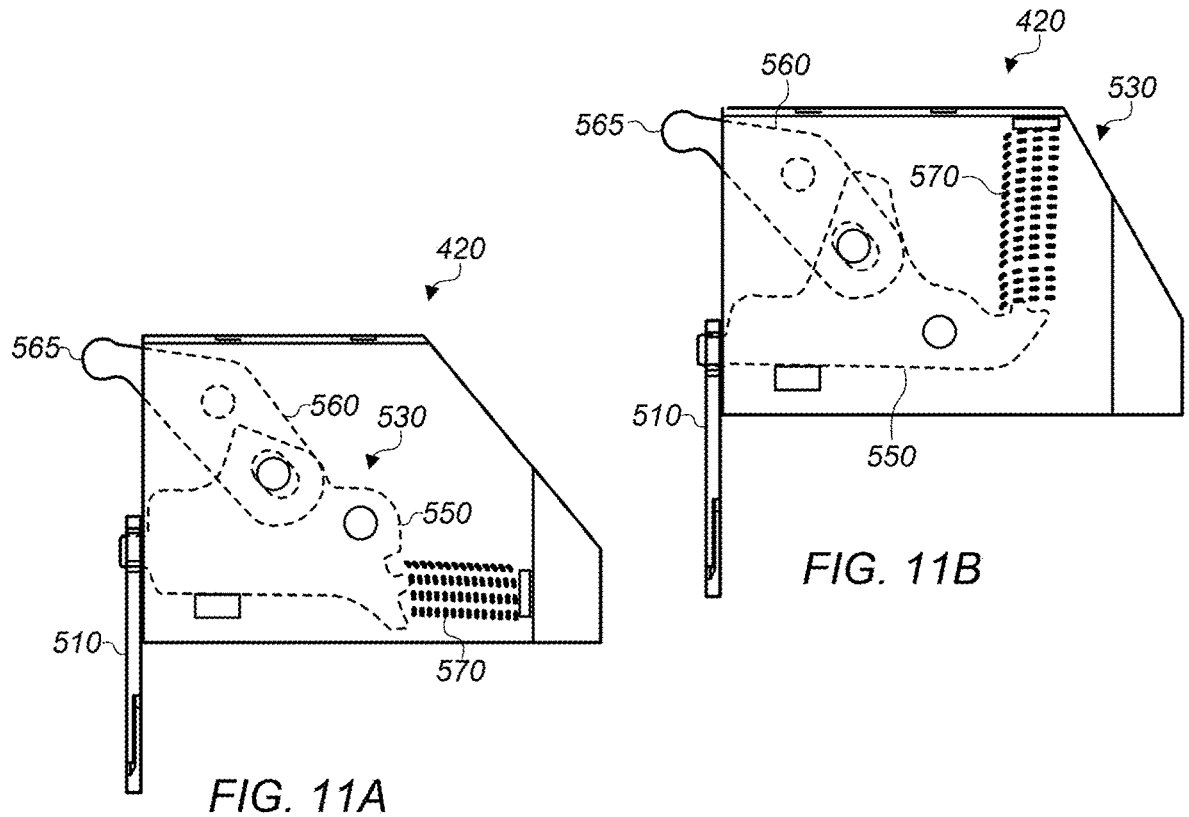
FIGS. 11A-B depict a diagram of a side interior view of an embodiment of a fastener receiver of a fastener insertion device in a striking position.
Figure 11B:
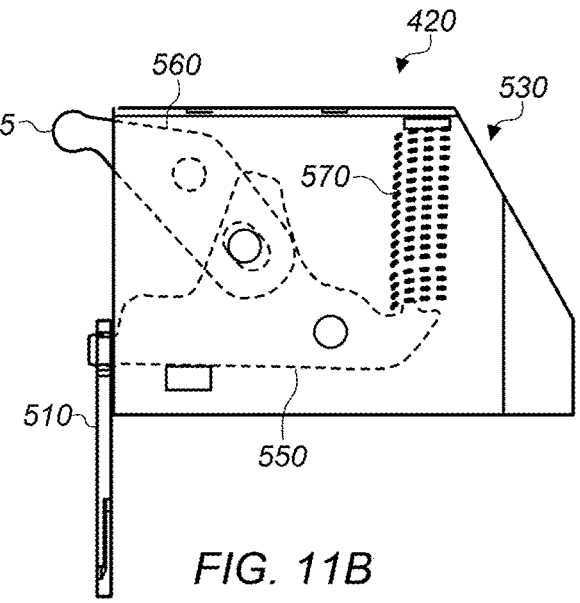

FIGS. 10A-B depict a diagram of a side interior view of different embodiments of the fastener receiver 420 of the fastener insertion device 400 in a starting position. FIGS. 11A-B depict a diagram of a side interior view of different embodiments of the fastener receiver 420 of the fastener insertion device 400 in a striking position. In some embodiments, the fastener receiver 420 may include a striker 510, an actuator 520 (e.g., depicted in FIGS. 3-8), an engagement mechanism 530, and a diverter 540 (e.g., depicted in FIGS. 12-15). The striker 510 may, when activated, strike, during use, a head (at the proximal end of the fastener) of the fastener 100, 100a such that distal end(s) of elongated member(s) coupled to the head or a proximal end of the fastener penetrate(s), during use, a surface of an object. In some embodiments, the actuator 520 may be coupled to the fastener receiver 420.

The actuator 520 may be coupled to the fastener receiver 420. In some embodiments, the actuator may slide linearly relative to the fastener receiver. The actuator, when for example struck against a surface with a first force, may move the actuator in a first direction (e.g., substantially toward the top of the fastener receiver). Portions of the actuator may be positioned within the fastener receiver while a striking surface of the actuator may extend outside of the fastener receiver.

The striker 510 may be coupled to the fastener receiver 420. In some embodiments, the striker may slide linearly relative to the fastener receiver. The striker may function during use to strike a proximal end or head of a tracking fastener such that a distal end(s) of the tracking fastener penetrates the surface of the object struck by the actuator. In response to the actuator moving in a first direction as a result of a first force, the striker may move in a second direction with a second force.

In some embodiments, the engagement mechanism 530 may couple the striker 510 to the actuator 520. The engagement mechanism may transmit, during use, a first force applied in a first direction from the actuator to the striker as a second force in a second direction. In some embodiments, the first direction is substantially opposite to the second direction.

In some embodiments, the engagement mechanism 530 may include a first connector 550 and a second connector 560. The first connector 550 may couple the striker 510 to the second connector 560 and the second connector may couple the first connector to the actuator 520. The first and second connectors may function such that a force applied to the actuator is transmitted during use to a proximal end of a tracking fastener via the striker 510. An engaging portion 565 (e.g., depicted in FIGS. 3, 6, 9-11, 13-15) of the second connector 560 may extend out of the fastener receiver 420 such that, for example, as the actuator moves in response to a force imparted by a surface struck by the actuator, the actuator then conveys the engaging portion upward from the position depicted in FIG. 10 to the position depicted in FIG. 11.

In some embodiments, the fastener receiver may include a resilient member 570 such that after use of the fastener insertion device the resilient member moves, during use, the striker and the actuator back to a starting position (e.g., before the actuator has struck the surface as depicted, for example, in depicted in FIG. 10). The starting position may be referred to as a resting position where there may be very little compression on the resilient member.

Figure 12:
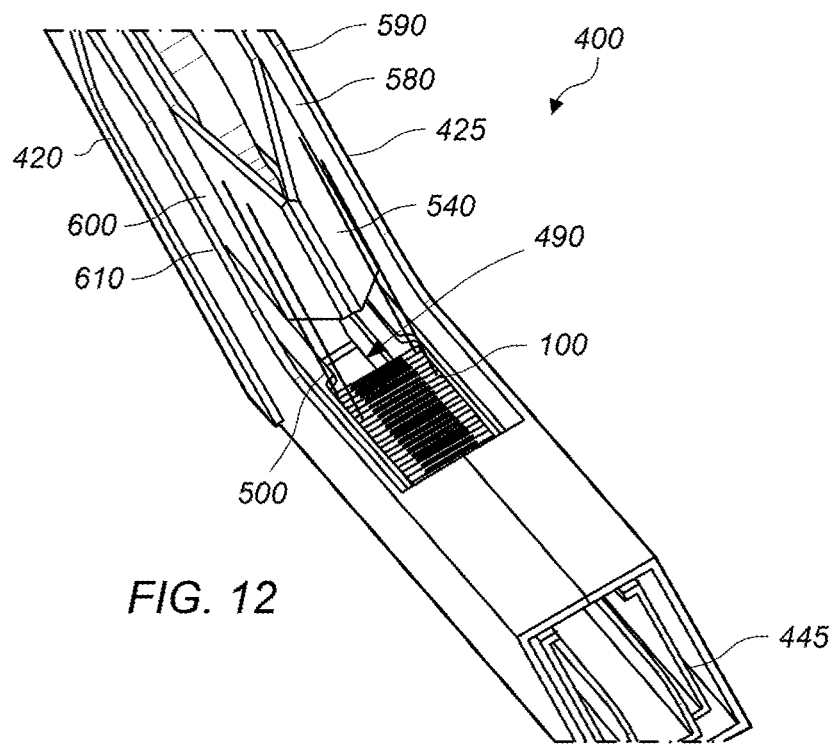
FIG. 12 depicts a diagram of a rear perspective view of an embodiment of a diverter of a fastener insertion device (some antennas not depicted for clarity).
Figure 13:
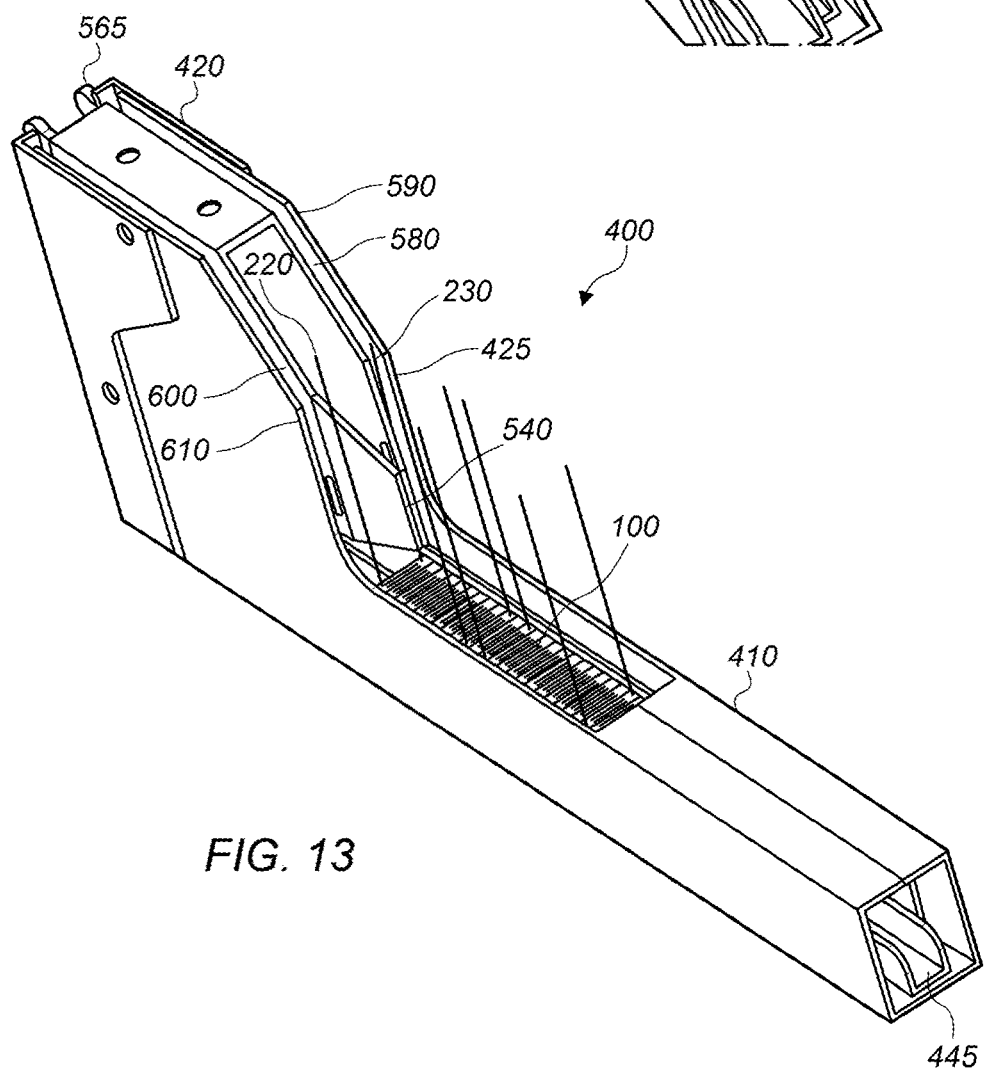
FIG. 13 depicts a diagram of a rear perspective view of an embodiment of a diverter of a fastener insertion device (some antennas not depicted for clarity).

In some embodiments, the diverter 540 may be coupled to an end 425 of the fastener receiver 420 (e.g., depicted in FIGS. 12-13). In some embodiments, the diverter may direct or position, during use, the first end 220, 220a (e.g., depicted in FIGS. 1A-B) of the antenna in a first channel 580 along a first side 590 of the fastener receiver 420 and the second end 230, 230a (e.g., depicted in FIGS. 1A-B) of the antenna (if applicable) in a second channel 600 along a second side 610 of the fastener receiver (e.g., depicted in FIGS. 12-13). The second side of the fastener receiver may be positioned opposite the first side of the fastener receiver. The channels may function to keep the antenna away from the drive mechanism of the fastener insertion device. Keeping the head of the fastener clear of obstructions may allow the striker to transfer the second force to the head of the fastener such that chances of the striker damaging one or more of the antenna are reduced.

In some embodiments, the diverter 540 may be formed by what looks substantially like a wedge. The edge or point of the wedge being centered down the handle pointed towards the first end of the fastener insertion device.

If the channels do not position the antenna away from the drive mechanism, the drive mechanism may damage and/or destroy the antenna during use of the fastener insertion device. Having channels sized (e.g., appropriate height and/or width) may ensure that the antenna are not unnecessarily bent as opposed to a fastener insertion device without channels, wherein the antenna would have to bend (and tangle and break) to move through known types of fastener insertion devices (if any commercially available machines existed capable of even accommodating fasteners disclosed in herein).

Figure 14:
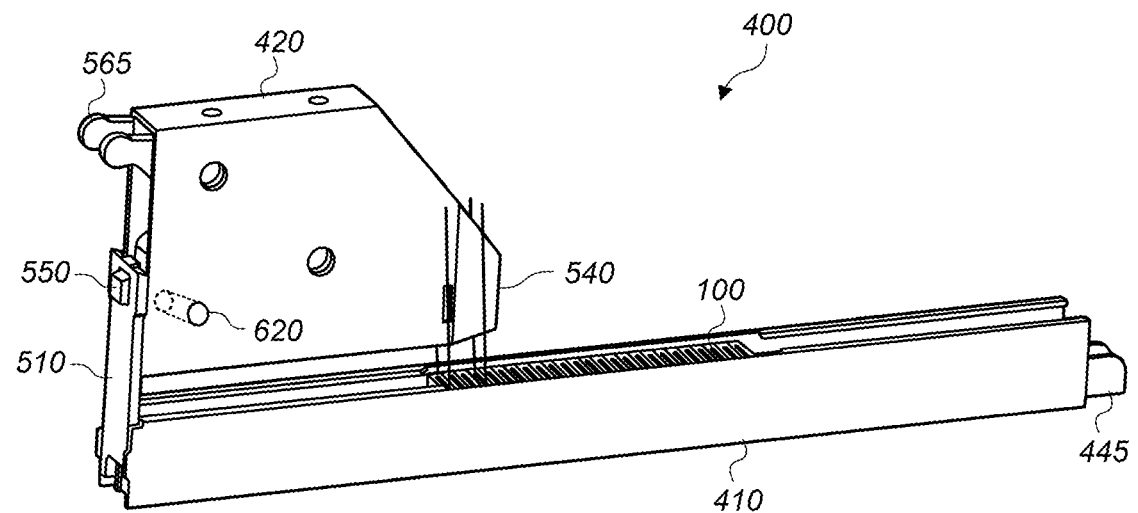
FIG. 14 depicts a diagram of a perspective view of an embodiment of a diverter of a fastener insertion device (some antennas not depicted for clarity).
Figure 15:
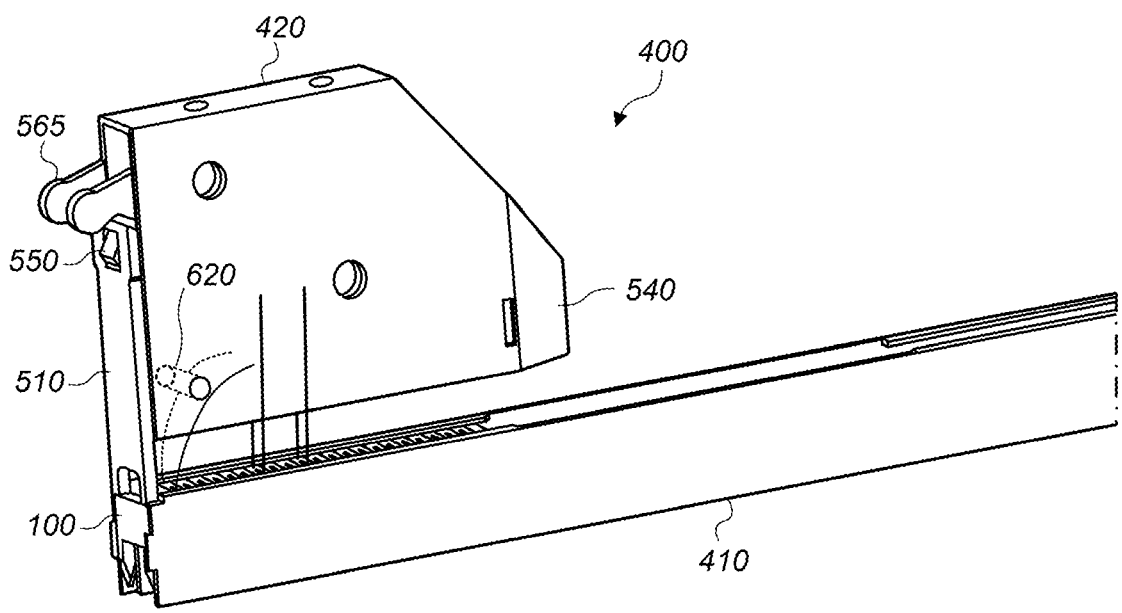
FIG. 15 depicts a diagram of a perspective expanded view of an embodiment of a diverter of a fastener insertion device (some antennas not depicted for clarity).

In some embodiments, the fastener receiver may include a router 620 (e.g., depicted in FIGS. 9 and 14-15). The router 620 functions to reposition the first and or first and second ends of the antenna as the tracking fastener moves toward the striker such that the first and second ends are bent away from the striker and towards a first end of the fastener insertion device. The router may be positioned towards a second end of the fastener insertion device and substantially towards an end of the fastener receiver of the fastener insertion device. The router may be positioned slightly above the receiving chamber in the fastener receiver. The router may be positioned just before the striker toward the end 425 of the fastener receiver (e.g., depicted in FIGS. 12-13). In some embodiments, the router may include an elongated member (e.g., a rod, a pin). The elongated member may extend through substantially all of the fastener receiver of the fastener insertion device.

Figure 16:
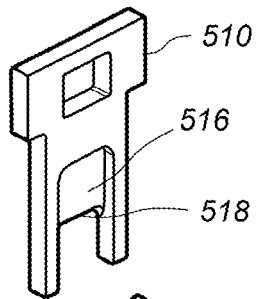
FIG. 16 depicts a diagram of a perspective view of an embodiment of a receiving chamber with an antenna guide and a striker of a fastener insertion device.
Figure 16:
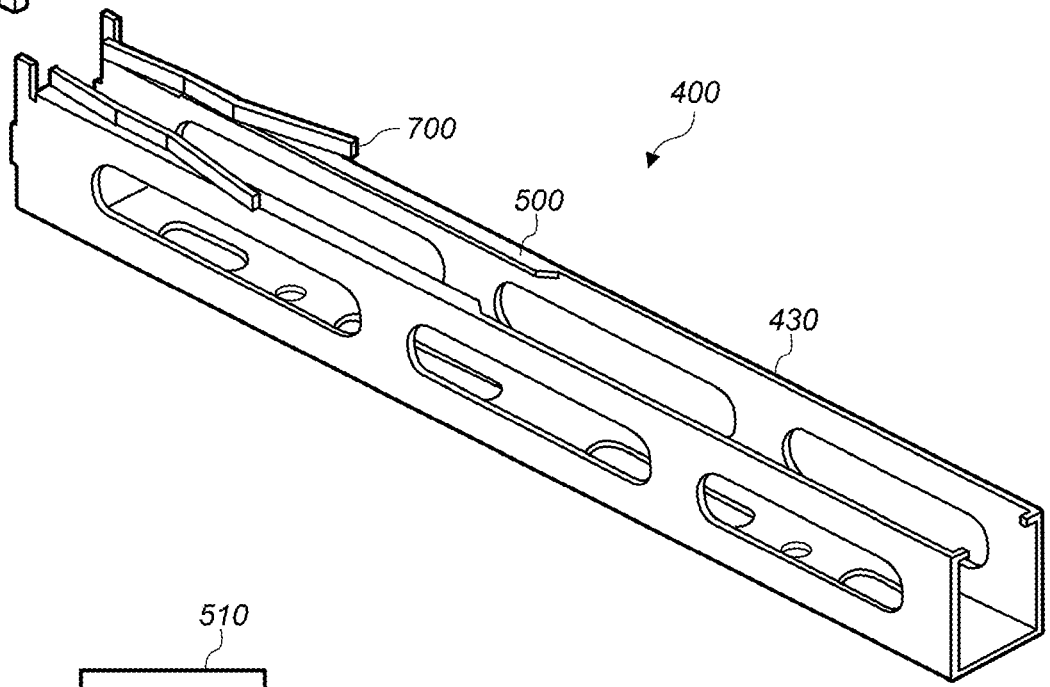
Figure 17:
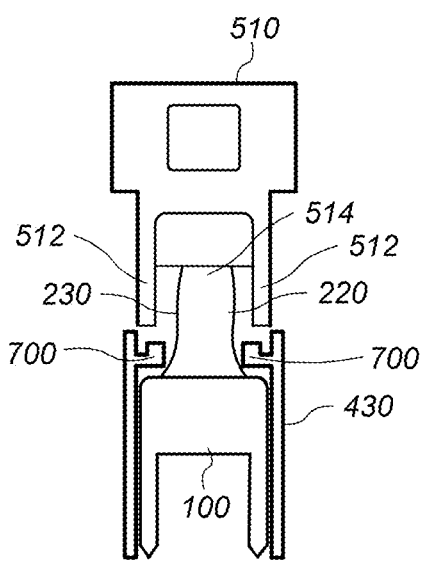
FIG. 17 depicts a diagram of a front view of an embodiment of a receiving chamber with an antenna guide and a striker of a fastener insertion device.

In some embodiments, the router may also accompanied by a tapered reverse angle guide 700 positioned on the magazine just behind the striker 510 such that the antenna 220-230 are guided toward the middle of the fastener insertion device and away from the striker tip to avoid any damage during insertion into surface of an object (e.g., depicted in FIGS. 16-17). The guides 700 may function to push the antenna away from the striker 510 such that the striker does not strike the antenna during insertion.

The striker 510 may include one or more striking members 512 (e.g., depicted in FIG. 17). The striking members may function to make contact with a portion of a tracking fastener such that at least a portion of the tracking fastener is inserted into an object. The striking members may be positioned differently relative to the striker depending upon the position of the antenna relative to a head of a tracking fastener. In some embodiments, the striker may include an opening 514 to avoid the protruding antenna of the tracking fastener. Antenna may be directed by guide(s) 700 toward opening 514 in order avoid damage from the striker. In some embodiments, a striker 510 may include a depression 516.

The depression 516 may function to push antenna away from the striker. The depression may include an angled bottom edge 518 which function to push the antenna away from the striker during use.

As such as the fasteners are conveyed forward through the receiving chamber via the advancement mechanism (with the antenna moving through the first and the second channels), the router may be positioned in order to bend the antenna back away from the striker and the reverse tapered angle guide may be positioned behind the striker and tapering up to the striker chamber in order to guide the antenna away from the striker tip.

In some embodiments, a method may include installing a tracking fastener using a fastener insertion device. The method may include positioning at least a body of a tracking fastener in a receiving chamber in a handle of a fastener insertion device as described herein. The method may include conveying the tracking fastener through the receiving chamber to a fastener receiver of the fastener insertion device coupled to a first end (handle). The method may include positioning the first end of the antenna in a first channel along a first side of the fastener receiver and the second end of the antenna in a second channel along a second side of the fastener receiver using a diverter. The method may include positioning the antenna toward the first end of the fastener insertion device using a router. The method may include centering the wires as they are fed toward and into the striker chamber using a reverse tapered angle guide. The method may include applying a first force in a first direction using a surface of an object to an actuator such that the actuator moves in the first direction relative to the fastener receiver to which the actuator is coupled. The method may include transmitting the first force applied in the first direction to the actuator to a striker as a second force in a second direction using an engagement mechanism. The method may include transmitting the second force from the striker to the tracking fastener such that the distal end of the at least one elongated member penetrates the surface of the object.

In some embodiments, the method may include striking the tracking fastener on the head exclusive of the region where the antenna emanate, to insert the fastener into the surface of an object.

In some embodiments, the method may include inserting a tracking fastener into a surface of an object without damaging the antenna or the function of the antenna.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of inserting tracking fasteners using a fastener insertion device, comprising:
positioning a first end of a first of one or more antenna, of a tracking fastener, in a first channel along a first side of a fastener receiver of a fastener insertion device using a diverter;
repositioning at least one end of the one or more antenna as the tracking fastener moves toward a striker of the fastener insertion device such that the at least one end is bent away from the striker using a router positioned before the striker;
activating the striker of the fastener insertion device;
striking a portion of a head of the tracking fastener using the striker, wherein the striker is shaped to avoid the fastener head region from which the one or more antenna emanate, wherein the one or more antenna extends out away from the tracking fastener; and
inserting of at least a portion of the tracking fastener in an object, whereby damage occurring to the one or more antenna is inhibited during insertion.

2. The method of claim 1, wherein the tracking fastener comprises a staple.

3. The method of claim 1, further comprising:
guiding the first of the one or more antenna around a drive mechanism of the fastener insertion device using the first channel and the diverter, wherein the first of one or more antenna extends out away from the tracking fastener; and
feeding of the tracking fastener using the first channel, whereby damage occurring to the first of the one or more antenna is inhibited.

4. The method of claim 1, wherein the tracking fastener comprises a nail.

5. The method of claim 1, further comprising receiving tracking fasteners within a receiving chamber, wherein a handle is coupled to the fastener receiver, wherein the handle forms the receiving chamber therein such that the fastener receiver is in communication with the receiving chamber.

6. The method of claim 5, further comprising:
guiding one or more of the antenna toward a center of the fastener insertion device and away from the striker using a tapered reverse angle guide positioned at least adjacent the receiving chamber just behind the striker and leading to the striker.

7. The method of claim 5, further comprising receiving a collated plurality of tracking fasteners within the receiving chamber.

8. A method of inserting tracking fasteners using a fastener insertion device, comprising:
positioning a first end of a first of one or more antenna, of a tracking fastener, in a first channel along a first side of a fastener receiver of a fastener insertion device using a diverter;
guiding the first of the one or more antenna around a drive mechanism of the fastener insertion device using the first channel and the diverter;
feeding the tracking fastener using the first channel, whereby damage occurring to the first of the one or more antenna is inhibited; and
repositioning at least one end of the one or more antenna as the tracking fastener moves toward a striker such that the at least one end is bent away from the striker using a router positioned before the striker.

9. The method of claim 8, further comprising:
activating the striker of the fastener insertion device;
striking a portion of a head of the tracking fastener using the striker, wherein the striker is shaped to avoid a fastener head region from which the one or more antenna emanate; and
inserting of at least a portion of the tracking fastener in an object, whereby damage occurring to the one or more antenna is inhibited.

10. The method of claim 8, wherein the tracking fastener comprises a staple.

11. The method of claim 8, wherein the tracking fastener comprises a nail.

12. The method of claim 8, further comprising receiving tracking fasteners within a receiving chamber, wherein a handle is coupled to the fastener receiver, wherein the handle forms the receiving chamber therein such that the fastener receiver is in communication with the receiving chamber.

13. The method of claim 12, further comprising:
guiding one or more of the antenna toward a center of the fastener insertion device and away from the striker using a tapered reverse angle guide positioned at least adjacent the receiving chamber just behind the striker and leading to the striker; and inserting of the tracking fastener, whereby damage occurring to the one or more antenna is inhibited.

14. The method of claim 12, further comprising receiving a collated plurality of tracking fasteners within the receiving chamber.

15. A method of inserting tracking fasteners using a fastener insertion device, comprising:
positioning a first end of a first of one or more antenna, of a tracking fastener, in a first channel along a first side of a fastener receiver of a fastener insertion device using a diverter;
feeding the tracking fastener using the first channel, whereby damage occurring to the first of the one or more antenna is inhibited; and
repositioning at least one end of the one or more antenna as the tracking fastener moves toward a striker such that the at least one end is bent away from the striker using a router positioned before the striker.

16. The method of claim 15, further comprising:
activating the striker of the fastener insertion device;
striking a portion of a head of the tracking fastener using the striker, wherein the striker is shaped to avoid a fastener head region from which the one or more antenna emanate; and
inserting of at least a portion of the tracking fastener in an object, whereby damage occurring to the one or more antenna is inhibited.

17. The method of claim 15, wherein the tracking fastener comprises a staple.

18. The method of claim 15, wherein the tracking fastener comprises a nail.

19. The method of claim 15, further comprising receiving tracking fasteners within a receiving chamber, wherein a handle is coupled to the fastener receiver, wherein the handle forms the receiving chamber therein such that the fastener receiver is in communication with the receiving chamber.

20. The method of claim 19, further comprising:
guiding one or more of the antenna toward a center of the fastener insertion device and away from the striker using a tapered reverse angle guide positioned at least adjacent the receiving chamber just behind the striker and leading to the striker; and inserting of the tracking fastener, whereby damage occurring to the one or more antenna is inhibited.

21. The method of claim 19, further comprising receiving a collated plurality of tracking fasteners within the receiving chamber.

\* \* \* \* \*